Jan. 1, 1935.  E. DAUTEL  1,986,254
ACETYLENE GAS GENERATOR
Original Filed April 16, 1931
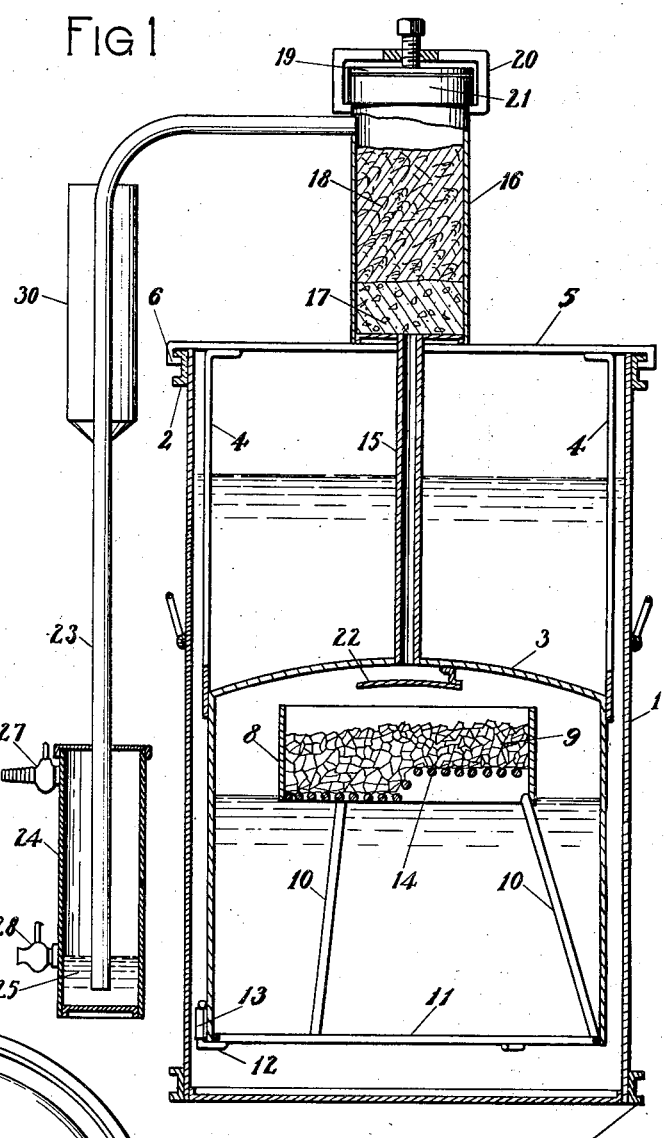
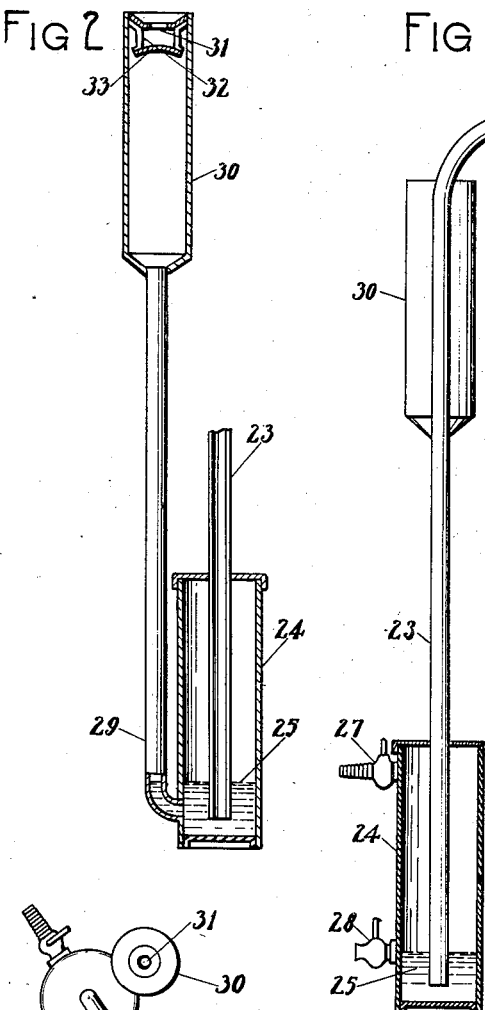
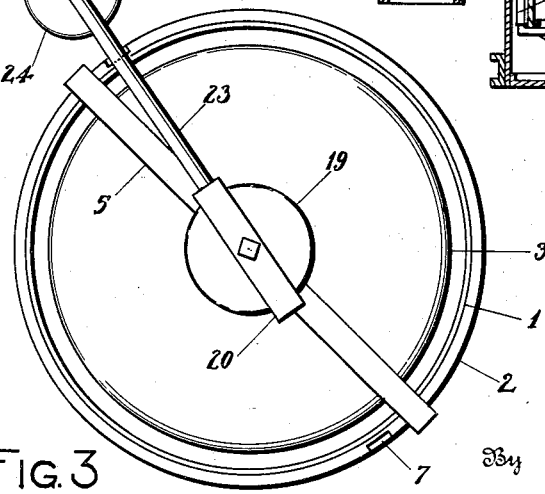
Inventor
Ernest Dautel
By Stewart Blackman
Attorney Patented Jan. 1, 1935

1,986,254

UNITED STATES PATENT OFFICE 1,986,254

ACETYLENE GAS GENERATOR

Ernest Dautel, Hartford, Conn., assignor of one-third to Stewart Blackman, Washington, D. C.

Application April 16, 1931, Serial No. 530,677
Renewed October 20, 1934

1 Claim. (Cl. 48—22)

The invention relates to a gas generator.

The gas generator to which the invention applies in particular, is of the type employing a combination of water with calcium carbide to generate acetylene gas, but is not limited, within the purview of the invention, to these specific components or to a specific gas.

An object of the invention is to provide a gas generator which is safe and economical in operation.

Another object is to provide a gas generator capable of supplying gas at increased pressure in the later stages of operation thereof.

Another object is to provide a gas generator in which excessive gas pressures are readily relieved.

Another object is to provide a gas generator which may be quickly assembled and disassembled.

Another object is to provide a gas generator having a gas purifying chamber which is readily accessible for reloading with purifying substances.

Another object is to provide a gas generator which may be economically manufactured.

Another object is to provide a gas generator of structural characteristics to enable its ready manufacture by welding.

According to the invention, the gas generator has an intercommunicating reservoir and generating chamber from which generated gas is conducted through a water-retaining relief chamber apertured above the water line to discharge gas at normal pressures to a consuming appliance, and a vent conduit is connected to the relief chamber to sustain the water in common therewith, to direct rapid expulsion of the water under excessive gas pressures, through the vent conduit, to vent excess gas and relieve the pressure thereof.

The vent conduit is trapped to recover the water impelled therein by gas escaping therethrough.

The gas generator is provided with a carbide receptacle having a perforated bottom formed in steps to suddenly inundate a relatively greater portion of carbide after partial consumption thereof, and thereby provide increased gas pressure near later stages of operation of the generator.

A purifying chamber is arranged exterior of the apparatus to provide ready accessibility thereto.

The invention is embodied in a gas generator shown in the accompanying drawing in which the views are as follows:

Fig. 1 is a sectional elevation through the gas generator;

Fig. 2 is an elevation, partially in section of the pressure relieving apparatus; and Fig. 3, a plan view of the generator.

The gas generator has a cylindrical, open-top reservoir 1, suitably reinforced at each end thereof by external flanged hoops 2.

Arranged within the reservoir and spaced from the bottom thereof, is a dome-shaped generating chamber 3, having its bottom open to communicate with the reservoir.

The generating chamber is suspended by side bars 4, from a crossbar 5, superimposed diametrically across the top edge of the reservoir.

The crossbar 5, has its ends formed in downturned hooks 6, normally engaging the upper reinforcing hoop, the top flange of which is notched as at 7, to accommodate the hooks and enable the crossbar to be disengaged, by partial rotation thereof, from the reservoir, to withdraw the generating chamber.

Arranged within the generating chamber is a carbide receptacle 8, which carries the carbide 9.

The carbide receptacle is supported by upstanding legs 10, connected at their lower ends to a base ring 11, adapted to fit loosely within the bottom end of the generating chamber, and detachably held therein by inwardly projecting brackets 12, which are turnable in straps 13, fastened to the outer surface of the generating chamber.

The carbide receptacle has a perforated bottom or grate 14, to permit water ascending in the generating chamber to penetrate the carbide.

Substantially midway across the receptacle, the grate 14, is stepped upwardly to form the bottom surface of the receptacle into a depressed portion and an elevated portion.

Thus, in the early stages of gas generation, the water is limited to penetrating the carbide through a portion of the sectional area thereof, thereby initiating operation of the generator with a minimum consumption of carbide for a relatively normal gas pressure.

When the carbide in the lowermost portion of the receptacle is consumed, the upwardly stepped grate 14, permits the ascending water to penetrate the carbide through the whole sectional area thereof, thereby suddenly accelerating the rate of gas generation during later stages of operation of the generator.

The generating chamber communicates by an upwardly extending conduit 15, with a purifying chamber 16, arranged upon the crossbar 5, and designed to contain suitable purifying agents such as porous stone 17, and excelsior 18, to extract impurities such as naphthalene from the generated gas.

The purifying chamber has a removable airtight cover 19, secured by a clamp 20, engaging an annular shoulder 21 formed around the cell.

Suspended within the generating chamber from the top thereof, is a baffle 22, to prevent enlarged portions of carbide from obstructing the conduit 15.

Connected to the purifying chamber and extending outwardly and downwardly therefrom, is a rigid discharge conduit 23, carrying at its lower end, a relief chamber 24.

The relief chamber is partially filled with water 25, within which is terminated the discharge conduit 23, to exclude external gases therefrom, and to quench ignited gas which may be fed back from the consuming appliance with which the apparatus is employed.

The relief chamber is apertured above the water line thereof, to provide a gas discharge outlet into which is fitted a gas cock 27, having connected thereto a hose, (not shown) to deliver the gas to a consuming appliance.

Tapped into the relief chamber at the side thereof, is a drain cock 28, to determine the level of water 25.

Extending outwardly and upwardly from the relief chamber and connected thereto below the water line and relatively higher than the outlet end of the discharge conduit 23, is a vent conduit 29.

The lower portion of the vent conduit 29, forms an intercommunicating vessel with the relief chamber to sustain therewith the water 25.

When an excess of gas forms in the apparatus, or when external gases are fed back from the consuming appliance, a resultant pressure develops in the upper portion of the relief chamber.

The resultant pressure exerts a downward impulse upon the water 25, which, being partially sustained by the vent conduit 29, is thereby directed in rapid expulsion therethrough.

When the level of water 25, descends sufficiently to uncover the intake end of the vent conduit, the confined gas escapes therethrough, thereby dissipating and relieving excessive pressures.

The vent conduit terminates at its upper end in a trap or vent chamber 30, having a funneled top 31, through which gas emitted through the vent conduit escapes and to provide a funnel for filling the relief chamber.

Suspended from the underside of the funneled top 31, by ribs 32, is a concavo-convex splash plate 33, of relatively smaller diameter than the vent chamber, to deflect and return gas-impelled water projected from the relief chamber.

In operation, the reservoir 1, is charged with water which rises in the generating chamber 3, and penetrates to the lowermost portion of carbide 9, causing generation of acetylene gas at relatively normal pressure.

When the carbide has become partially consumed there is a tendency near later stages of operation for pressure built up in the generating chamber to become partially dissipated through various losses incident to operation. The water penetrates the upper portion of carbide and a suddenly increased rate of gas generation ensues.

The generated gas flows upward through the conduit 15, and into the purifying chamber 16, wherein impurities such as naphthalene are extracted.

The cleansed gas then enters the discharge conduit 23, by which it is conveyed into the water 25, permeating therethrough and collecting in the upper portion of the relief chamber from which it is delivered when the gas cock 27 is opened.

When gas pressure in the upper portion of the relief chamber exceeds the pressure required to maintain the apparatus in normal operation, such as when a sudden stoppage occurs in the consuming appliance, or when oxygen is fed back therefrom, the water 25 is thereby forced through the vent conduit 29.

As the intake of the vent conduit becomes uncovered the confined gas is released therethrough dissipating excessive pressures.

A sufficient quantity of water remains in the relief chamber to seal the discharge conduit 23 and prevent a reversed flow of gases thereinto.

Water is introduced into the relief chamber by way of the vent conduit, permitting uninterrupted operation of the gas generator.

Of course, the invention is susceptible of various modifications and changes without departing from the scope thereof, as hereinafter claimed.

I claim:

In an acetylene gas generator, an open-top reservoir adapted to contain water, a diametrically disposed cross-bar superimposed across the top thereof, side-bars secured to said cross-bar near the ends thereof and depending therefrom, a gas generating chamber having a top gas outlet, submerged in said reservoir and secured to said side-bars and carried thereby, a carbide receptacle having a stepped grate bottom arranged in said gas generating chamber, a baffle plate interposed immediately above said carbide receptacle and between said receptacle and said gas outlet to prevent obstruction of said outlet by protuberating carbide, and means to conduct generated gas from said gas generating chamber.

ERNEST DAUTEL.